E. HORTON.
Calipers.
No. 148,065. Patented March 3, 1874.
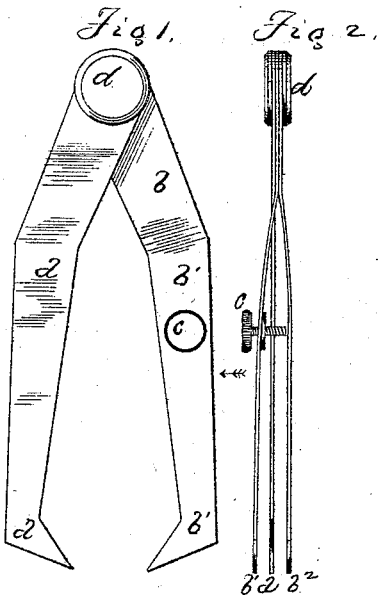
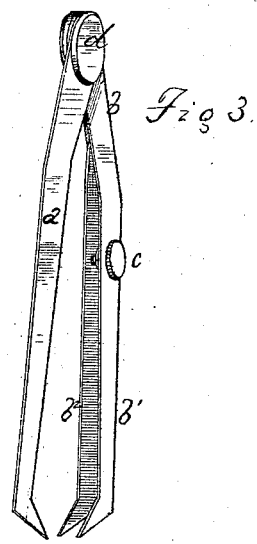
WITNESSES.
John Pollitt
Timothy E. Steele
INVENTOR.
Eli Horton
By W. E. Simonds
Atty.

UNITED STATES PATENT OFFICE.

ELI HORTON, OF WINDSOR LOCKS, CONNECTICUT.

IMPROVEMENT IN CALIPERS.

Specification forming part of Letters Patent No. 148,065, dated March 3, 1874; application filed December 11, 1872.

*To all whom it may concern:*

Be it known that I, ELI HORTON, of Windsor Locks, in the county of Hartford and State of Connecticut, have invented certain new and useful Improvements in Calipers, of which the following is a specification, reference being had to the accompanying drawings, in which—

Figure 1 is a side or face view of the same. Fig. 2 is what may be called an edge view, looking from the position of the arrow in Fig. 1. Fig. 3 is a perspective view of the calipers.

The invention consists in a third leg or prong to calipers, two on one side and one on the other, so constructed that two of the prongs can be closed together, or opened by a setscrew or otherwise, by means of which I am able to obtain an accurate measurement of the diameter of the body of a screw as well as if the threads of the screw were entirely removed. Such accurate measurement is secured by applying the two prongs, which are opened by the set-screw, to the screw to be measured, in such a manner that the opened prongs straddle the thread and rest on the body of the screw, while the other prong can be brought to a point exactly opposite on the body of the screw, thus giving the exact diameter of the body of the screw as well as if the thread were entirely removed. With the common calipers now in use such accurate measurement cannot be secured, because the body of the screw cannot be measured at right angles on account of the thread of the screw running obliquely around the body of the screw.

This improvement in calipers can be used on screws of any diameter, and on screws of any number of threads to the inch, and the improvement can be applied to any form of caliper now in use.

This construction of calipers also serves another useful purpose. In measuring the diameter or thickness of any object, whether metal or wood, a more accurate measurement can be obtained. The two prongs opened by the set-screw both resting upon the surface of the object to be measured, not only brings the two prongs at right angles with the surface, but also the single prong at right angles with the opposite surface, the two prongs acting as a rest and a guide to the single prong.

In using the common calipers now in use it is difficult to obtain an accurate measurement, on account of the liability of obliquing the calipers, so that neither prong is at right angles with the surface, and consequently the measurement of the diameter is greater than the actual diameter, but this improvement removes the difficulty, as the two prongs both resting on the surface must bring them at right angles to the surface and the single prong at right angles with the opposite surface.

In the drawings, the letter $a$ indicates one leg of the calipers of the common construction; and $b$ indicates the other leg with its foot or lower part divided into two parts, $b^1$ $b^2$. It may spring together as one leg, or may be sprung apart by the use of the adjusting-screw $c$ to any desired extent. The two legs are pivoted together at $d$.

Although I have shown only one of the legs of the calipers divided, it is perfectly obvious that both may be divided in the same way, if desired.

It is also obvious that the divided feet $b^1$ $b^2$ instead of being spring parts in one piece with the leg $b$ may be made separate from the leg $b$ and appropriately hinged thereto. I, however, prefer the spring parts.

From the foregoing description it is plain that the foot or lower part of the leg may be expanded, as described, and used for the purposes described, and that this divided foot may be made to straddle the thread of a screw while the other foot sets directly upon the body of the screw, thus securing an accurate measurement of the diameter of such body.

I claim as my invention—

Calipers for measuring the diameter of solid bodies, having one leg divided and expansible, substantially as and for the purposes described hereinbefore.

ELI HORTON.

Witnesses:
WM. E. SIMONDS,
JOHN POLLITT.